United States Patent [19]

Day et al.

[11] Patent Number: 4,513,123
[45] Date of Patent: Apr. 23, 1985

[54] SULFUR-CURABLE RUBBER SKIM STOCK COMPOSITIONS CONTAINING DITHIODIPROPIONIC ACID

[75] Inventors: Gary L. Day, Akron; James P. Robertson, Norton, both of Ohio

[73] Assignee: The Firestone Tire & Rubber Company, Akron, Ohio

[21] Appl. No.: 551,524

[22] Filed: Nov. 14, 1983

[51] Int. Cl.$^3$ .............................................. C08C 19/20
[52] U.S. Cl. .................................... 525/332.6; 525/343
[58] Field of Search .............................. 525/343, 332.6

[56] References Cited

U.S. PATENT DOCUMENTS 4,203,874  5/1980  Halasa ................................. 525/349

FOREIGN PATENT DOCUMENTS 158789  2/1983  Fed. Rep. of Germany ...... 525/343

Primary Examiner—Christopher A. Henderson
Attorney, Agent, or Firm—Frank J. Troy, Sr.

[57] ABSTRACT

A sulfur-curable rubber skim stock which upon curing exhibits improved adhesion to brass-plated steel under high humidity, heat aging conditions is provided. The sulfur-curable rubber skim stock comprises natural rubber or a blend of natural rubber and synthetic rubber, carbon black, an organo-cobalt compound, sulfur and a small amount of dithiodipropionic acid. The skim stock can be utilized in various applications where brass-plated steel reinforcement is desirable including tires, conveyor belts, hoses and the like.

9 Claims, No Drawings

SULFUR-CURABLE RUBBER SKIM STOCK COMPOSITIONS CONTAINING DITHIODIPROPIONIC ACID

BACKGROUND OF THE INVENTION

The invention relates to sulfur-curable rubber skim stocks containing dithiodipropionic acid. More particularly, the invention relates to sulfur-curable rubber skim stocks which contain dithiodipropionic acid as a co-curing agent with sulfur.

Sulfur-curable rubber skim stocks especially those containing relatively high levels of sulfur are susceptible to sulfur blooming under common storage conditions. Stocks containing sulfur bloom often lack building tack which can lead to poor adhesion properties. Accordingly, it is generally necessary to remove the sulfur bloom from the surface of the stock using an organic solvent prior to using the stock to form laminates. As will be evident, this can be a time consuming procedure and in addition the use of organic solvents for such a purpose often leads to the emission of solvent fumes to the ambient atmosphere. Thus, it is conventional practice to replace a portion of the elemental sulfur in such rubber skim stocks with a so-called sulfur donor compound. Such sulfur donor compounds are materials which liberate sulfur during the curing process. However, it has been found that many conventionally used sulfur donor compounds cause a detrimental effect on the adhesion of the cured skim stock to brass-plated steel, particularly adhesion of the cured skim stock to brass-plated steel under high humidity, heat aging conditions. Thus, the discovery of a sulfur donor compound which does not cause a detrimental effect on the adhesion of the rubber skim stock to brass-plated steel under high humidity, heat aging conditions would constitute an important development.

SUMMARY OF THE INVENTION

In accordance with the present invention, a sulfur-curable rubber skim stock is provided which comprises:

(a) 100 parts by weight of a rubber selected from the group consisting of natural rubber and blends of natural rubber and synthetic rubber;

(b) from about 30.0 to about 80.0 parts by weight of carbon black;

(c) an organo-cobalt compound present in sufficient amount to provide from about 0.05% to about 0.35% by weight of cobalt metal based on total weight of skim stock;

(d) from about 2.5 to about 9.0 parts by weight of sulfur; and (e) from about 0.1 to about 2.5 parts by weight of dithiodipropionic acid.

The sulfur-curable rubber skim stock when cured in contact with brass-plated steel exhibits improved adhesion thereto under high humidity, heat aging conditions in comparison to sulfur-curable rubber skim stocks which do not contain dithiodipropionic acid.

DETAILED DESCRIPTION OF THE INVENTION

As indicated, the skim stock of the invention contains natural rubber or blends of natural rubber and synthetic rubber. Various synthetic rubbers may be employed in the blends including rubbery polymers of conjugated dienes and copolymers of conjugated dienes and vinyl aromatic hydrocarbons.

Conjugated dienes which may be utilized to prepare the polymers and copolymers include 1,3-butadiene, 2-methyl-1,3-butadiene(isoprene), 2,3-dimethyl-1,3-butadiene, 1,3-pentadiene, 1,3-hexadiene and the like. The preferred diene is 1,3-butadiene.

Vinyl aromatic hydrocarbons which may be utilized in preparing the copolymers include styrene, alpha-methyl styrene, vinyl toluene, vinyl naphthalene and the like. The preferred vinyl aromatic hydrocarbon is styrene.

The copolymers may contain up to 50% by weight of the vinyl aromatic hydrocarbon. The above-described polymers and copolymers and their method of preparation are well known in the rubber and polymer arts. Many of the polymers and copolymers are commercially available.

The skim stock may contain 100 parts by weight of natural rubber or 100 parts by weight of the blend of natural rubber and synthetic rubber with the blend containing up to 35.0% of the synthetic rubber.

The skim stock contains carbon black. Any of the carbon blacks conventionally utilized in rubber skim stocks may be used. Thus, the carbon black may be a reinforcing carbon black such as a channel black or a high abrasion furnace black (HAF) or a semi-reinforcing black. A preferred black is HAF black.

Amounts of carbon black employed in the skim stock may range from about 30.0 to about 80.0 parts by weight with preferred amounts ranging from about 45.0 to about 70.0 parts by weight.

The skim stock contains an organo-cobalt compound which serves as an adhesion promoter. Any of the organo-cobalt compounds known in the art to promote the adhesion of rubber to metal may be used in the skim stock. Thus, suitable organo-cobalt compounds which may be employed include cobalt salts of fatty acids such as stearic, palmitic, oleic, linoleic and the like; cobalt salts of aliphatic or alicyclic carboxylic acids having from 6 to 30 carbon atoms; cobalt chloride, cobalt naphthenate; cobalt carboxylate and an organo-cobalt-boron complex commercially available under the designation Manobond C from Wyrough and Loser, Inc., Trenton, N.J. Manobond C is believed to have the structure:

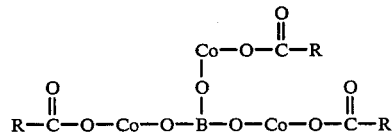

in which R is an alkyl group having from 9 to 12 carbon atoms. For convenience, the above structure is hereinafter represented by the formula

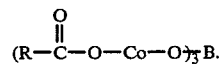

Manobond C is available as a blue, viscous liquid and may contain from 15.5 to 16.5% cobalt (Manobond C16) or 17.5 to 18.5% cobalt (Manobond C18); the compound has a viscosity at 25° C. of 3000 to 9000 centipoises and an ash content of from 22 to 25% by weight. The preferred organo-cobalt compound for use in the skim stocks of the invention is Manobond C.

Amounts of organo-cobalt compound which may be employed in the skim stock generally depend upon the specific nature of the organo-cobalt compound selected, particularly the amount of cobalt metal present in the compound. Since the amount of cobalt metal varies considerably in organo-cobalt compounds which are suitable for use, it is most appropriate and convenient to base the amount of the organo-cobalt compound utilized on the amount of cobalt metal desired in the finished skim stock composition. Accordingly, it may in general be stated that the amount of organo-cobalt compound present in the skim stock composition should be sufficient to provide from about 0.05% to about 0.35% by weight of cobalt metal based upon total weight of the rubber skim stock composition with the preferred amounts being from about 0.1% to about 0.2% by weight of cobalt metal based on total weight of skim stock composition.

The skim stock also contains elemental sulfur as the principal curing or vulcanizing agent. Amounts of sulfur used in the skim stock may range from about 2.5 to about 9.0 parts by weight with the preferred amounts ranging from about 4.0 to about 7.0 parts by weight.

In addition to elemental sulfur, the skim stock contains dithiodipropionic acid which serves as a sulfur donor and co-curing agent. As indicated, the use of dithiodipropionic acid has surprisingly been found to improve adhesion of the skim stock to brass-plated steel under conditions of high humidity, heat aging.

Amounts of dithiodipropionic acid used in the skim stock may range from about 0.1 to about 2.5 parts by weight with preferred amounts ranging from about 0.25 to about 0.75 parts by weight.

In addition to the foregoing components, the rubber skim stock of the invention may contain other conventional additives which are commonly utilized in rubber skim stock compositions. Thus, the compositions may include fillers such as clays, silicas or calcium carbonate; process and extender oils; antioxidants; cure accelerators; cure activators; cure stabilizers and the like.

The rubber skim stock can be prepared by mixing the ingredients of the composition in well known manner using an internal mixer such as a Banbury mixer or a mill. The skim stock can be applied to brass-plated steel wire by calendering or other known application techniques. Brass-plated steel wire generally contains a plating consisting of 70% copper and 30% zinc.

Adhesion of the rubber skim stocks to brass-plated steel wires was determined using a wire pull-out test conducted substantially in accordance with the procedure described in ASTM D2229.

Thus, wire pull-out adhesion pads were prepared using a building jig by first laying down a 1"×6"×0.274" thick strip of the rubber skim stock. Then, brass-plated steel wires were placed in slots perpendicular to the mold in which the jig is placed across the rubber strip. A strip of curable rubber skim stock of the same dimension as the first strip is placed on top of the wires. The resultant composite is then placed in a curing press and cured for 25 minutes at 300° F. Samples of the cured composite samples were then tested for wire pull-out adhesion under normal (unaged) conditions, after steam aging, after heat aging, after aging in an oxygen bomb and after heat aging at 95% relative humidity for extended periods of time using a Model 1130 Instron Tester operating at a crosshead speed of 5" per minute. Steam aging was done in a pressure tight bomb for 2 hours at 300° F. in a saturated steam atmosphere. Heat aging was done in a forced air oven for 2 days at 250° F. Oxygen bomb aging was done in a pressure tight bomb at 300 psi pressure in a 100% oxygen atmosphere at 180° F. for 15 hours. Heat aging at 95% relative humidity (R.H.) was conducted in a humidity chamber for extended periods of time (e.g., 3 days, 7 days, 14 days, etc.).

The following examples are submitted for the purpose of further illustrating the nature of the invention and are not to be regarded as a limitation on the scope thereof. Parts and percentages shown in the examples are by weight unless otherwise indicated.

EXAMPLE 1

In this example, a sulfur-curable rubber skim stock of the invention containing a dithiodipropionic acid was prepared. A rubber skim stock having the same formulation except that it did not contain dithiodipropionic acid was also prepared to serve as a control. The skim stocks had the following formulations:

| Ingredients | Example No. Parts by weight | |
| --- | --- | --- |
|  | Control | 1 |
| Natural rubber | 100.0 | 100.0 |
| HAF black | 50.0 | 50.0 |
| Zinc oxide | 8.0 | 8.0 |
| Stearic acid | 0.5 | 0.5 |
| Aromatic oil | 2.0 | 2.0 |
| Santoflex 13[1] (antioxidant) | 1.5 | 1.5 |
| Manobond C16[2] | 2.0 | 2.0 |
| Nobs Special[3] (accelerator) | 0.6 | 0.6 |
| Santogard PVI[4] | 0.3 | 0.3 |
| Sulfur masterbatch[5] | 7.5 | 7.5 |
| Dithiodipropionic acid | — | 0.5 |
|  | 172.4 | 172.9 |

[1] N—(1,3-dimethylbutyl)-N'—phenyl-p-phenylenediamine
[2] An organo-cobalt compound containing 16% cobalt represented by the formula $(R-C(=O)-O-Co-O-)_3B$
[3] N—oxydiethylene benzothiazole-2-sulfenamide
[4] N—(cyclohexylthio)-phthalimide
[5] 80% sulfur, 20% oil The above formulations were mixed in conventional rubber compounding equipment and then tested for stress-strain properties and adhesion to brass-plated steel wire in accordance with the procedure described above. Test conditions and results are shown in Table I.

TABLE I

| Example No. | Control | 1 |
| --- | --- | --- |
| Stress-Strain Cure: 23 min. @ 300° F. | | |
| Tensile, psi | 3632 | 3681 |
| Modulus, psi | | |
| 25% | 135 | 148 |
| 100% | 786 | 642 |
| 200% | 1381 | 1542 |
| Elongation at break, % | 426 | 416 |
| Wire Pull-Out Adhesion lbs/inch | | |
| Normal (unaged) | 156 | 149 |
| Steam aged, 2 hrs. @ 300° F. | 115 | 94 |
| Heat aged, 2 days @ 250° F. | 142 | 145 |
| Oxygen bom aged (15 hours oxygen) | 155 | 148 |
| Heat aged at 95% Relative Humidity | | |
| 7 days @ 180° F. | 142 | 155 |
| 14 days @ 180° F. | 78 | 102 |

As the above data indicates, the rubber skim stock of the invention shows slightly lower adhesion than the control under normal, steam aged and oxygen bomb aging conditions. However, the rubber skim stock of the invention shows significantly improved adhesion under high humidity, heat aging conditions compared to the control skim stock.

In this evaluation, a sulfur-curable rubber skim stock of the invention containing dithiodipropionic acid as a sulfur donor (i.e., repeat of Example 1) was compared to sulfur-curable rubber skim stocks containing other known surfur donors (i.e., Examples a–d). The rubber skim stocks had the following formulations:

|  | Example | | | | |
|---|---|---|---|---|---|
| Ingredients | 1 | a | b | c | d |
| Natural rubber | 100.0 | 100.0 | 100.0 | 100.0 | 100.0 |
| HAF black | 50.0 | 50.0 | 50.0 | 50.0 | 50.0 |
| Zinc oxide | 8.0 | 8.0 | 8.0 | 8.0 | 8.0 |
| Stearic acid | 0.5 | 0.5 | 0.5 | 0.5 | 0.5 |
| Aromatic oil | 2.0 | 2.0 | 2.0 | 2.0 | 2.0 |
| Santoflex 13 | 1.5 | 1.5 | 1.5 | 1.5 | 1.5 |
| Manobond C16 | 2.0 | 2.0 | 2.0 | 2.0 | 2.0 |
| Nobs Special | 0.6 | 0.6 | 0.6 | 0.6 | 0.6 |
| Santogard PVI | 0.3 | 0.3 | 0.3 | 0.3 | 0.3 |
| Sulfur masterbatch | 7.5 | 7.5 | 7.5 | 7.5 | 7.5 |
| Dithiodipropionic acid | 0.5 | — | — | — | — |
| Sulfasan R[1] | — | 0.56 | — | — | — |
| Morfax[2] | — | — | 1.35 | — | — |
| Vultac #4[3] | — | — | — | 0.95 | — |
| Methyl Tuads[4] | — | — | — | — | 1.15 |
|  | 172.9 | 172.96 | 173.75 | 173.35 | 173.55 |

[1]dimorpholino disulfide
[2]2-(morpholinodithio)-benzothiazole
[3]alkylphenol disulfide
[4]tetramethylthiuram disulfide The above skim stock compositions were mixed and tested for stress-strain properties and wire adhesion properties using the procedure of Example 1. Test conditions and results are shown in Table II.

TABLE II

| Example | 1 | a | b | c | d |
|---|---|---|---|---|---|
| Stress-Strain Cure: 23 min @ 300° F. | | | | | |
| Tensile, psi | 2792 | 3123 | 3099 | 3053 | 2955 |
| Modulus, psi | | | | | |
| 25% | 136 | 158 | 192 | 130 | 135 |
| 100% | 515 | 594 | 684 | 539 | 477 |
| 200% | 1259 | 1458 | 1690 | 1297 | 1171 |
| Elongation at break, % | 386 | 354 | 328 | 388 | 396 |
| Wire Pull-Out Adhesion lbs/in | | | | | |
| Normal (unaged) | 204 | 189 | 172 | 200 | 137 |
| Steam aged, 2 hrs. @ 300° F. | 153 | 184 | 64 | 154 | 83 |
| Heat aged, 2 days @ 250° F. | 161 | 170 | 153 | 148 | 133 |
| Oxygen bomb aged (15 hrs. oxygen) | 106 | 117 | 99 | 116 | 95 |
| Heat aged at 95% R.H. | | | | | |
| 3 days @ 180° F. | 194 | 153 | 172 | 185 | 146 |
| 7 days @ 180° F. | 138 | 79 | 125 | 115 | 82 |
| 14 days @ 180° F. | 88 | 45 | 63 | 85 | 55 |

As indicated by the above data, the rubber skim stock of the invention (Example 1) which contains dithiodipropionic acid shows improved adhesion under high humidity, heat aging conditions as compared to similar rubber skim stocks containing other sulfur donors.

We claim:

1. A sulfur-curable rubber skim stock composition which comprises:
   (a) 100 parts by weight of a rubber selected from the group consisting of natural rubber and blends of natural rubber and synthetic rubber;
   (b) from about 30.0 to about 80.0 parts by weight of carbon black;
   (c) an organo-cobalt compound present in sufficient amount to provide from about 0.05% to about 0.35% by weight of cobalt metal based on total weight of skim stock;
   (d) from about 2.5 to about 9.0 parts by weight of sulfur; and
   (e) from about 0.1 to about 2.5 parts by weight of dithiodipropionic acid.

2. The sulfur-curable rubber skim stock of claim 1 wherein said rubber is natural rubber.

3. The sulfur-curable rubber skim stock of claim 1 wherein said rubber is a blend of natural rubber and synthetic rubber containing up to 35% by weight of synthetic rubber.

4. The sulfur-curable rubber skim stock of claim 1 wherein said carbon black is HAF.

5. The sulfur-curable rubber skim stock of claim 1 wherein said organo-cobalt compound is an organo-cobalt complex represented by the formula

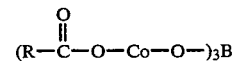

in which R is an alkyl group having from 9 to 12 carbon atoms.

6. The sulfur-curable rubber skim stock of claim 1 wherein said carbon black is present in an amount of from about 45.0 to about 70.0 parts by weight.

7. The sulfur-curable rubber skim stock of claim 1 wherein said organo-cobalt compound is present in sufficient amount to provide from about 0.1 to about 0.2% by weight of cobalt metal based on total weight of skim stock.

8. The sulfur-curable rubber skim stock of claim 1 wherein said sulfur is present in an amount of from about 4.0 to about 7.0 parts by weight.

9. The sulfur-curable rubber skim stock of claim 1 wherein said dithiodipropionic acid is present in an amount of from about 0.25 to about 0.75 parts by weight.

* * * * *